United States Patent
Wildi

[15] 3,657,923
[45] Apr. 25, 1972

[54] ELECTRODYNAMOMETER

[72] Inventor: Theodore Wildi, Quebec, Canada

[73] Assignee: Lab-Volt (Quebec) Limited, Quebec, Province of Quebec, Canada

[22] Filed: July 6, 1970

[21] Appl. No.: 52,177

[52] U.S. Cl. .................................................73/134
[51] Int. Cl. ...................................................G01l 3/22
[58] Field of Search ...............73/134, 136 R, 117, 126, 127, 73/130, 131; 310/93

[56] References Cited

UNITED STATES PATENTS

| | | | |
|---|---|---|---|
| 1,600,071 | 9/1926 | Shaifer | 73/134 |
| 2,211,108 | 8/1940 | Fitzgerald | 73/134 |
| 1,860,504 | 5/1932 | James | 310/93 X |
| 2,389,361 | 11/1945 | Hagg et al. | 73/134 |
| 2,978,901 | 4/1961 | Sundberg | 73/136 |
| 3,029,634 | 4/1962 | Schmitz | 73/134 |

*Primary Examiner*—Charles A. Ruehl
*Attorney*—Raymond A. Robic

[57] ABSTRACT

An electrodynamometer for measuring the torque of a motor. The electrodynamometer includes a supporting structure and a stator mounted for rotation on the structure and having a winding adapted for energization by a variable source of direct current to produce a predetermined number of magnetic poles. A squirrel-cage rotor is mounted for rotation within the stator and coupled to the motor the torque of which is to be measured. The rotation of the rotor of the electrodynamometer develops a torque tending to rotate the stator. A spring is connected between the stator and the structure for absorbing the torque exerted on the stator by the rotor and the angle of rotation of the stator against the action of the spring is measured on a scale for providing an indication of the torque of the motor.

9 Claims, 9 Drawing Figures

INVENTOR
Theodore WILDI

BY

ATTORNEY

SPEED

INVENTOR
Théodore WILDI

ATTORNEY

PATENTED APR 25 1972

INVENTOR
Théodore WILDI

BY
Raymond A. Robic

ATTORNEY

ELECTRODYNAMOMETER

This invention relates to an electro-mechanical apparatus commonly known as an electrodynamometer for measuring the mechanical torque developed by a motor or other device.

One type of electrodynamometer which is used in industrial and laboratory applications consists of a copper disc mounted for rotation and coupled to a motor the torque of which is to be measured. A permanent magnet which may be placed more or less close to the copper disc produces a flux $\phi$ causing a voltage to be induced in the disc when the latter is turned. The induced voltage gives rise to an induced current, the magnitude of which depends principally upon the electrical resistance offered by the disc. Known theoretical considerations show that the torque developed depends directly upon the speed of rotation and upon the square of the effective flux which goes across the disc from the permanent magnet. Measurement of this torque may be done by attaching a spring to the permanent magnet and by providing such spring with a pointer adapted to move across a scale. The speed-torque relationship of such a dynamometer, for a given setting of the permanent magnet, increases linearly with the speed and the torque is very low when the speed is low.

Another commonly known type of electrodynamometer is similar to the one above in that it also uses a copper disc. However, the permanent magnet is replaced by an electromagnet which is fixed with respect to the disc but is energized by a source of variable current, thereby changing the flux which crosses the copper disc. In this set up, the mechanical displacement of the magnet is no longer necessary because the flux can be made to vary according to the current rather than according to a mechanical displacement. Again, in this case, the torque is directly proportional to the speed and is very low when the speed is low.

Most electric motors develop quite powerful starting torques which may range up to 300 percent of their nominal full load value. However, the known dynamometers produce a high torque only at high speeds. Consequently, the known dynamometers are not entirely satisfactory because they do not have the inherent property to measure high torques at low speed.

It is therefore the main feature of the invention to provide an electrodynamometer having speed-torque characteristics which are more desirable for electric motors developing high starting torques.

The electrodynamometer, in accordance with the invention, includes a supporting structure and a stator mounted for rotation on the supporting structure and having winding adapted for energization by a variable source of direct current to produce a predetermined number of magnetic poles. A squirrel-cage rotor is mounted for rotation within the stator and coupled to the motor the torque of which is to be measured. The rotation of the rotor of the electrodynamometer develops a torque tending to rotate the stator. A spring is connected between the stator and the structure for absorbing the torque exerted on the stator by the rotor. Means are provided for measuring the amount of rotation of the stator against the action of the spring for providing an indication of the torque of the motor.

The spring interconnecting the stator and the structure supporting the stator may advantageously be a torsional spring mounted coaxially with the stator. One end of the stator may be provided with a scale and a pointer may be located on the supporting structure for indicating the angle of rotation of the stator. The scale is calibrated for indicating directly the torque of the motor.

The invention will now be disclosed with reference to the accompanying drawings illustrating a preferred embodiment of the invention and in which.

Figure 1:
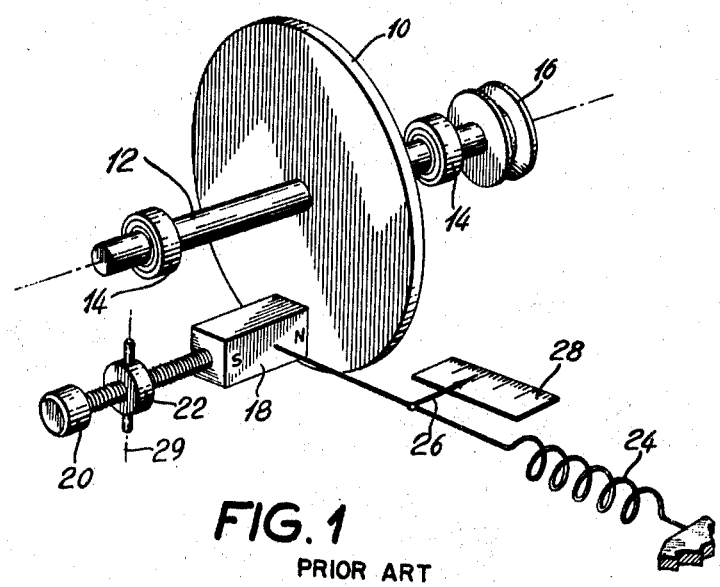
FIG. 1 illustrates a known dynamometer used for measuring the torque of a motor.

FIG. 1 shows one type of dynamometer which is used in industrial and laboratory applications. It consists of a copper or aluminum disc 10 mounted on a shaft 12 supported on bearings 14 and rotatable by means of a pulley 16.

Figure 2:
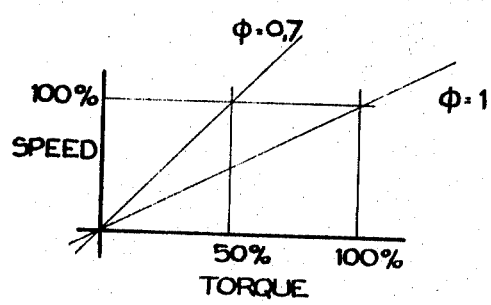
FIG. 2 illustrates the speed-torque characteristics of such a known dynamometer.

A permanent magnet 18 is placed more or less close to disc 10 by means of screw 20 rotating in supporting member 22. The permanent magnet produces a flux $\phi$ which causes a voltage to be induced in the disc when the latter turns. The value of this voltage depends on both the flux and the speed of rotation $\omega$ of the disc. This induced voltage produces an induced current whose magnitude depends upon the electrical resistance R offered by the disc. Known theoretical considerations show that, at moderate speeds, the torque developed is approximately proportional to $\phi^2\omega/R$, and depends therefore directly upon the speed of rotation and upon the square of the effective flux which crosses the disc from the permanent magnet. This speed-torque relationship is shown in FIG. 2 (and again as curve B in FIG. 6) in which it can be seen that, for a given setting of permanent magnet 18 ($\phi=1$, $\phi=0.7$), the torque increases linearly with the speed. It is also clear that the torque is zero when the disc does not rotate.

Measurement of this torque can be made by attaching a spring 24 to the permanent magnet and a pointer 26 to the spring. The pointer is free to move across a scale 28 when the permanent magnet is moved around axis 29 of the supporting member 22 by the rotation of the disc.

Figure 3:
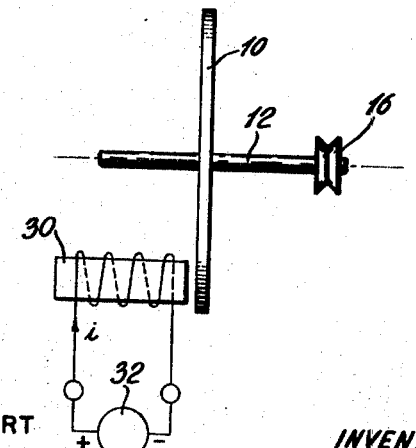
FIG. 3 illustrates another type of known dynamometer.

Another type of electrodynamometer which is commonly used employs an electromagnet 30 as shown in FIG. 3. This magnet is fixed as to position and receives a current (i) from a source 32. The value of this direct current can be varied by appropriate means thereby changing the flux which crosses the copper disc 10. The set-up is essentially similar to the one shown in FIG. 1, except that mechanical displacement of the magnet is no longer necessary because the flux can be made to vary according to a current rather than according to a mechanical movement. Again, in this case, the torque is directly proportional to speed and is very low when the speed is low.

Figure 4:
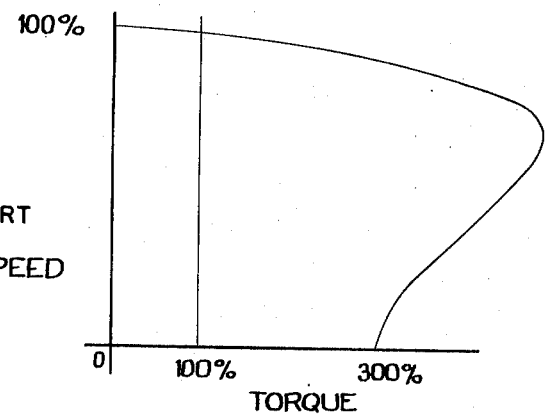
FIG. 4 illustrates the speed-torque characteristics of an electric motor.

Most electric motors develop quite powerful starting torques which may range up to, and even exceed, 300 percent of their normal full load value such as illustrated in FIG. 4. Ideally, in order to measure these torques, a dynamometer should have characteristics such that at low speed, its torque is large while at high speeds, its torque is somewhat lower. Clearly, the dynamometers described in FIGS. 1 and 2 do not meet these conditions and in fact, give almost the opposite result. They inherently give a high torque at high speed and low torque at low speed.

Figure 5:
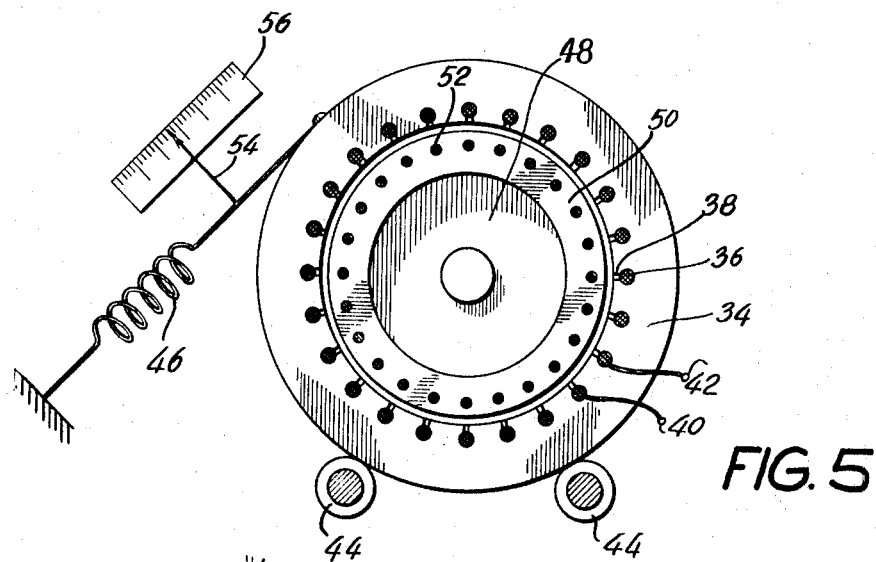
FIG. 5 is a diagrammatic view of an electrodynamometer in accordance with the invention.

In order to improve the torque-speed characteristics of the dynamometer, the arrangement shown diagrammatically in FIG. 5 was conceived. It comprises a conventional stator 34 such as used in commercial induction motors and carrying a winding 36 distributed in the slots 38 thereof so as to obtain two or more poles. The winding 36 is brought out to two terminals 40 and 42 which will be excited by a variable direct current so as to vary the magnetic flux within the dynamometer.

The stator is free to rotate on roller supports 44 and any effort to which the stator is subjected is translated to a spring 46 interconnecting the stator and a fixed support. A standard squirrel-cage die-cast rotor 48 having end rings 50 and bars 52 is rotatably mounted within the stator 34.

When the rotor is made to turn by some external agency, the rotor bars 52 cut across the flux created by the stator winding 36 thereby inducing a voltage and a current in the squirrel-cage of the rotor 48. The value of the voltage depends upon both the speed and the flux of winding 36. The current, however, depends not only upon the resistance of the rotor, but also upon its inductance, and therein lies the major difference of the dynamometer in accordance with the invention with the previously described dynamometers. Indeed, as will be shown, the inductance has a very important effect upon the speed-torque characteristics of this machine.

Figure 6:
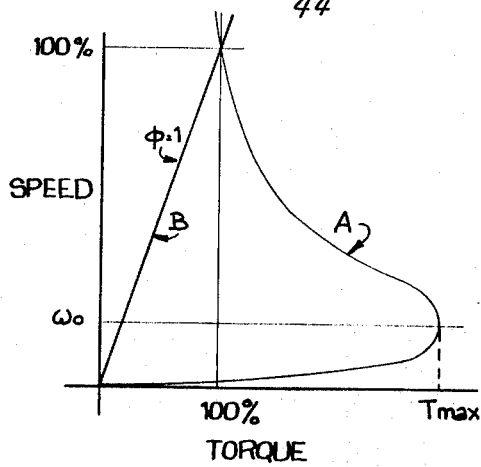
FIG. 6 illustrates the speed-torque characteristics of the electrodynamometer in accordance with the invention as well as that of FIG. 2 for comparison purposes.

The speed torque curve of this new dynamometer is shown as curve A in FIG. 6 and it can be seen that high torques are developed at low speeds and moderate torques at high speeds. For purposes of comparison, curve B shows the torque-speed curve of the dynamometers discussed in FIGS. 1 and 3. From curves A and B, it is clear that the new dynamometer is more suited to measuring the starting and running torque of motors. The torque attains a maximum value $T_{max}$ at a speed $\omega_o$. The value of this maximum torque as well as the speed at which it occurs depends upon the electrical design of the machine.

A theoretical analysis of this dynamometer shows that for a two-pole configuration the torque T is given by the equation.

$$T = K \omega M^2 I^2 R/(R^2 + \omega^2 L^2)$$

in which
- $T$ = torque in ft.lbs
- $\omega$ = speed of rotation in radians/sec.
- $M$ = mutual inductance between the stator and rotor windings (in henrys)
- $I$ = DC current in the stator winding (in amperes)
- $R$ = Resistance of the rotor winding (in ohms)
- $L$ = Self-inductance of the rotor (in henrys)
- $K$ = A constant which depends upon the units employed above.

Torque-speed curve A of FIG. 6 is a direct result and a graphical representation of this equation. From this equation we can also deduce that the maximum torque $T_{max}$ is developed at a speed $\omega_o$ where:

$$\omega_o = R/L$$

Dynamometers which have to develop large torques at low speeds, must therefore have rotors in which the ratio $R/L$ is low. This implies rotors having a larger inductance and low resistance. Squirrel-cage rotors have this basic property. On the other hand, the copper disc rotors described in FIGS. 1 and 2 possess very low inductance, with the result that their maximum torque is developed only at very high speeds. This is why copper disc dynamometers are not suited to measuring the starting torques of commercial induction rotors.

The speed-torque curve of this dynamometer is better adapted to measure the torque-speed characteristics of induction motors as well as DC motors. It should be noted that it also develops no torque when the speed is zero. However, the dynamometer can be designed to develop very powerful torques at speeds as small as 5 percent of full load speed, which is sufficiently close to the stalling point of the motor under test. Indeed, it is often preferable to have the machine crawling at a low speed, rather than completely stalled, because this tends to show up torque variations due to cogging.

Returning to FIG. 5, owing to the torque developed between the rotor 48 and the stator 34, the stator tends to revolve in the same direction as the rotor and is only retained in place by spring 46. The torque developed by the rotor is completely transmitted to the stator, except for minor frictional losses and consequently, a pointer 54 attached to spring 46 may be used to measure the torque developed according to the graduation across a scale 56.

At this point, it should be mentioned that a linear spring such as spring 46 in the diagram would have to be quite long to get any accurate reading on scale 56. This is rather difficult to obtain in reasonable space and for this reason, in practice, the linear spring 46 is replaced by a torsional spring coaxial with stator 34 and permitting a far greater rotation of the stator while still retaining complete linearity.

Figure 7:
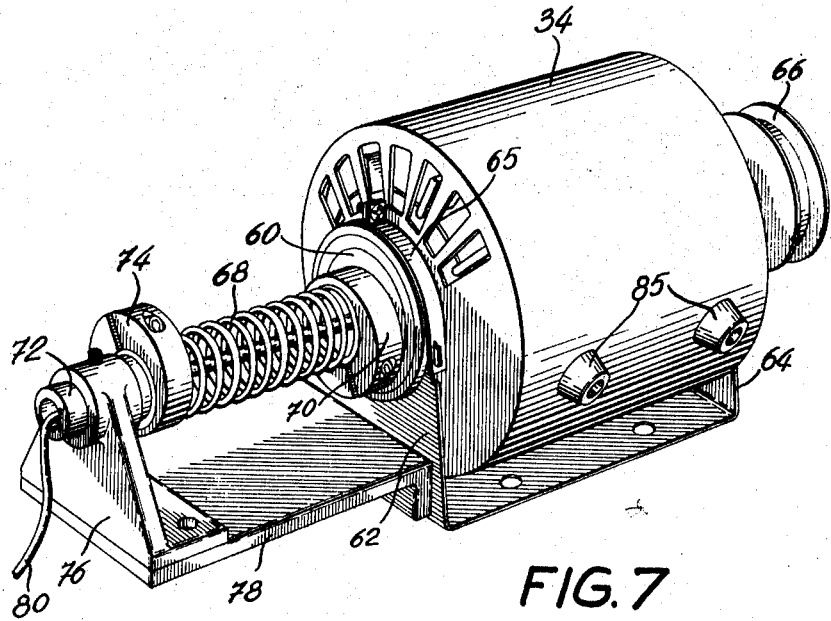
FIG. 7 illustrates the outside structure of the electrodynamometer of FIG. 5.

FIG. 7 shows the essential external structure parts of the new dynamometer. The stator 34 is supported on trunion bearings 60 which in turn are attached to supports 62 and 64 at the rear and the front end of the dynamometer respectively by clips 65. A pulley 66 is connected to the motor under test for which the torque-speed characteristics is desired. The stator 34 is directly connected to a torsional spring 68 by clamping member 70. Spring 68 is in turn clamped to a shaft 72 by means of clamping member 74. Shaft 72 is rotatably mounted in support 76 which, in turn, is secured to extension member 78 attached to support 62.

The stator winding is brought out through the center of the spiral spring 68 by means of wires 80.

Figure 8:
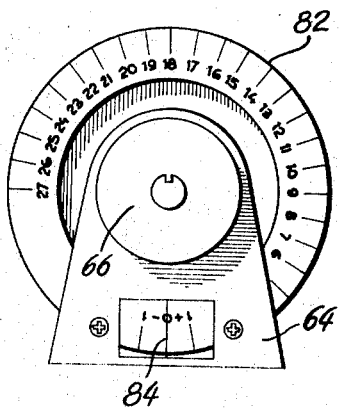
FIG. 8 illustrates the scale of the electrodynamometer of FIG. 7.

A scale 82 is located at the pulley end of the stator and is shown in more detail in FIG. 8. In effect, a 270° scale is used. The calibration of the scale can be varied by changing the number of spirals between the stator 34 and support 76, and can be made permanent by tightening clamping members 70 and 74 in position after calibration. The torque developed by the dynamometer is then varied by changing the excitation of the stator winding and by noting the deflection of the scale 82 against a pointer 84.

Stops 85 are secured to the stator to prevent more than one revolution of the stator.

Figure 9:
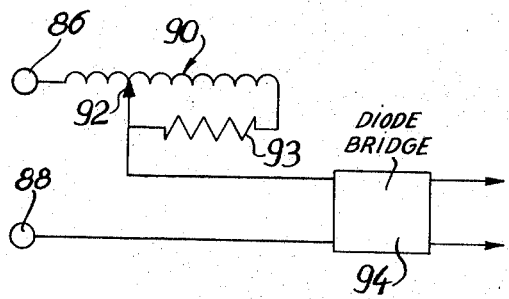
FIG. 9 illustrates a block diagram of the circuit providing direct current to the stator of the electrodynamometer.

The direct current for the stator winding is conveniently obtained by the circuit shown in FIG. 9. In this circuit, an alternating voltage is applied to terminals 86 and 88 to the input of an auto-transformer 90 connected in series with such terminals and having a variable tap 92. A voltage limiting resistor 93 is connected between tap 92 and one terminal of auto transformer 90. The output from the transformer tap 92 is fed to a diode bridge 94 so as to obtain a DC output which is applied to the terminals of the stator winding. No filtering is required because of the high inductance of the winding which in itself, acts as a satisfactory filter and assures a steady DC current in the stator.

The advantages of the above described dynamometer are as follows:

1. The torsional spring gives a very large scale deflection without sacrificing linearity and without having to use mechanical multipliers, such as rack and pinion systems. A linear spring could be used but would have required a much larger space to obtain a satisfactory scale deflection without the use of mechanical multipliers.

2. The inherent torque-speed properties of this dynamometer are much more adapted to the requirements of commercial motors. The torque is high when the speed is low and moderate when the speed is high.

3. The large rotor surface permits good heat dissipation which is somewhat restricted in disc-type dynamometers. In addition, the radial fans which are usually part of the die-casting on the rotor provide satisfactory cooling means for the machine.

I claim:
1. An electrodynamometer for measuring the torque of a motor comprising:
   a. a supporting structure;
   b. a stator mounted for rotation on said structure and including a winding adapted for energization by a variable source of direct current to produce a predetermined number of magnetic poles;
   c. a squirrel-cage rotor mounted for rotation within said stator and coupled to said motor for developing between said rotor and said stator a torque tending to rotate and stator;
   d. a torsional spring mounted coaxially with the axis of rotation of the rotor and having a predetermined number of spirals, said torsional spring being secured at one end to one end of said stator and at the other end to said supporting structure and being adapted to absorb the torque exerted on said stator by said rotor; and e. means for measuring the amount of rotation of said stator against the action of said spring for providing an indication of the torque of said motor.

2. An electrodynamometer as defined in claim 1, wherein said squirrel-cage rotor has a low ratio of resistance to inductance.

3. An electrodynamometer as defined in claim 1, wherein said supporting structure includes two upstanding portions located one at each end of the stator, each upstanding portion holding a trunion bearing rotatably supporting said stator.

4. An electrodynamometer as defined in claim 1, further comprising a shaft for said squirrel-cage rotor, and a pulley secured to said shaft and adapted for connection to said motor.

5. An electrodynamometer as defined in claim 1 further comprising clamping members for securing said spring at each end thereof to said stator and to said supporting structure respectively, said clamping members tightened in position after calibration of the electrodynamometer.

6. An electrodynamometer as defined in claim 1, further comprising a scale secured to one end of said stator and a pointer located on said supporting structure, said scale being calibrated so as to indicate directly the torque of the motor.

7. An electrodynamometer as defined in claim 6, wherein said stator includes stop means for preventing more than one revolution of the stator.

8. An electrodynamometer as defined in claim 1, wherein said direct current source is connected to said winding through conductors passing through the center of said torsional spring.

9. An electrodynamometer as defined in claim 1, wherein said variable source of direct current comprises an alternating current source having a first and a second terminals, a variable autotransformer having one terminal connected to the first terminal of said alternating current source and an intermediate movable tap, a voltage-limiting resistor connected between said tap and the other terminal of said autotransformer, and a diode bridge connected between the movable tap and the second terminal of said alternating current source for rectifying said alternating current, thus providing a variable source of direct current, for the stator winding.

* * * * *